United States Patent
Li et al.

(10) Patent No.: US 11,614,561 B1
(45) Date of Patent: Mar. 28, 2023

(54) GLASS CLAMPING MODEL BASED ON MICROSCOPIC DISPLACEMENT EXPERIMENT AND EXPERIMENTAL METHOD

(71) Applicant: Southwest Petroleum University, Sichuan (CN)

(72) Inventors: Yongming Li, Sichuan (CN); Tai Chang, Sichuan (CN); Yu Peng, Sichuan (CN); Huohai Yang, Sichuan (CN); Guowei Deng, Sichuan (CN); Juhui Zhu, Sichuan (CN); Cheng Chang, Sichuan (CN)

(*) Notice: Subject to any disclaimer, the term of this patent is extended or adjusted under 35 U.S.C. 154(b) by 0 days.

(21) Appl. No.: 17/859,240

(22) Filed: Jul. 7, 2022

(30) Foreign Application Priority Data

Nov. 11, 2021 (CN) .......................... 202111332382.4

(51) Int. Cl.
*G01V 99/00* (2009.01)
*G01G 11/00* (2006.01)
(Continued)

(52) U.S. Cl.
CPC ............ *G01V 99/005* (2013.01); *E21B 43/16* (2013.01); *E21B 49/00* (2013.01); *G01G 11/003* (2013.01); *G01N 13/04* (2013.01); *G01N 15/08* (2013.01)

(58) Field of Classification Search
CPC .... G01V 99/005; G01G 11/003; E21B 43/16; G01N 15/08; G01N 13/04
(Continued)

(56) References Cited

U.S. PATENT DOCUMENTS 10,969,514 B1 * 4/2021 Hou .......................... G01V 3/32
2005/0194148 A1 * 9/2005 Kerfoot .................. E21B 37/00
166/105.5
(Continued)

FOREIGN PATENT DOCUMENTS

CN 103161452 A * 6/2013
CN 105569637 A * 5/2016
(Continued)

OTHER PUBLICATIONS

Wu, Feng & Yao, Cong & Cong, Linlin & Xi, Yanping. (2020). Pore-scale gas-water flow in rock: Visualization experiment and simulation. Open Geosciences. 12. 532-546. 10.1515/geo-2020-0105. (Year: 2020).*
(Continued)

*Primary Examiner* — Alexander A Mercado
*Assistant Examiner* — Monica S Young (57) ABSTRACT

A glass clamping model based on microscopic displacement experiment, including a frame, a transparent silicone sleeve having a horizontal through hole, a piston, a piston cap arranged on the frame, a connecting plate, a screw compression bracket, a clamp support, a glass sheet entirety placed in the transparent silicone sleeve, a boss, a light source and a microscope. The transparent silicone sleeve is sheathed on the piston cap, the piston penetrates through the horizontal penetration hole; the connecting plate and the clamp support are respectively connected to both ends of the frame, the end of the screw compression bracket is clamped between the frame and the connecting plate, and the piston and the frame are connected with the clamp support; an emptying channel and an inlet passage are respectively arranged at both ends of the piston, and an outlet passage is arranged at an end of the piston.

7 Claims, 7 Drawing Sheets

(51) Int. Cl.
*E21B 43/16* (2006.01)
*E21B 49/00* (2006.01)
*G01N 15/08* (2006.01)
*G01N 13/04* (2006.01)

(58) Field of Classification Search
USPC .......................................................... 73/218
See application file for complete search history.

(56) References Cited

U.S. PATENT DOCUMENTS

2018/0321480 A1* 11/2018 Ohrt ........................ G01N 1/30
2020/0333241 A1* 10/2020 Zhao .................. G01N 21/0303

FOREIGN PATENT DOCUMENTS

| CN | 105651574 | A | * | 6/2016 | | |
|----|-----------|---|---|--------|---|---|
| CN | 106351622 | A | * | 1/2017 | ............. | E21B 43/16 |
| CN | 106351623 | A | * | 1/2017 | ............. | E21B 43/16 |
| CN | 106401542 | A | * | 2/2017 | ............. | E21B 43/16 |
| CN | 106437697 | A | * | 2/2017 | ............. | E21B 43/30 |
| CN | 206158736 | U | * | 5/2017 | | |
| CN | 109386276 | A | * | 2/2019 | ............. | E21B 43/16 |
| WO | WO-2019184753 | A1 | * | 10/2019 | ......... | G01N 21/0303 |

OTHER PUBLICATIONS

Wu F, Dai J, Shi L, Fan L, Guan Y, Li Y, Wang Q, Chen C. An Experiment-Based Study of Formation Damage Using a Microetching Model Displacement Method. Micromachines (Basel). Feb. 8, 2022;13(2):270. doi: 10.3390/mi13020270. PMID: 35208394; PMCID: PMC8879585. (Year: 2022).*

Translation CN-106351623—(Year: 2017).*

* cited by examiner

GLASS CLAMPING MODEL BASED ON MICROSCOPIC DISPLACEMENT EXPERIMENT AND EXPERIMENTAL METHOD

CROSS REFERENCE TO RELATED APPLICATION

This application claims priority benefit of Chinese invent Application No. 202111332382.4, filed on Nov. 11, 2021, and the entire contents of which are incorporated herein by reference.

TECHNICAL FIELD

The present invention relates to the field of oil and gas field development, in particular to a glass clamping model based on microscopic displacement experiment and experimental method.

DESCRIPTION OF PRIOR ART

At present, the physical models used for microscopic displacement experiment in the research of oil and gas field development are as follows:

(1) The bead clamping model, which is a layered porous media model with a layer of well sorted glass beads densely clamped by two pieces of glass or organic glass; but it is difficult to accurately control the changes in pore channel size of the pore system.

(2) The capillary network model, which is a two-dimensional transparent model with a capillary network etched on a glass sheet; but it does not have some morphological distribution characteristics of three-dimensional pore system, especially the characteristics of pore throat change.

(3) The pore network model, which is a two-dimensional transparent model with the pattern of porous media pore system made by taking the photo-etching technique on the glass or taking the optical imaging and chemical etching methods on the nylon; but it is difficult to simulate the complex properties of real core and mineral composition and inner surface of pore channel, no matter whether it is made of glass or nylon.

(4) The sandstone pore model, which is a model of real reservoir pore structure where the real core is sandwiched between two optical glass sheets after cleaning and slicing; but the poor light transmission results in unclear display of the status of partial flow field.

To sum up, the physical models currently used for microscopic displacement experiment cannot meet people's research needs in the process of oil and gas field development.

SUMMARY OF THE INVENTION

The present invention aims to propose a glass clamping model based on microscopic displacement experiment and experimental method for the existing problems in the prior art, so as to control the changes in pore channel size of the pore system more accurately, observe the flow state of fluid, more clearly with good light transmission, simulate the environment of fluid flow in the stratum more accurately and increase the clarity of observation.

On the one hand, the present invention provides a glass clamping model based on microscopic displacement experiment, comprising a transparent silicone sleeve, a piston, a piston cap, a frame, a connecting plate, a screw compression bracket, a clamp support, a glass sheet entirety, a boss, a light source and a microscope;

The glass sheet entirety is placed in the transparent silicone sleeve, the glass sheet entirety has a microscopic stereoscopic channel, and the transparent silicone sleeve has a horizontal penetration hole; the transparent silicone sleeve is sheathed on the piston cap, and the piston cap is arranged on the frame; the piston penetrates through the horizontal penetration hole, and the piston protrudes from the frame at both ends; the connecting plate and the clamp support are respectively connected to both ends of the frame, and the end of the screw compression bracket is clamped between the frame and the connecting plate; the screw compression bracket is connected with a compression screw, and the piston and the frame are connected with the clamp support; an emptying channel and an inlet passage are respectively arranged at both ends of the piston on the clamp support side, and an outlet passage is arranged at the end of the piston on the connecting plate side; a horizontal through hole is arranged inside the piston, a diversion trench is vertically arranged in the middle of the top surface of the piston, and the horizontal through hole and the diversion trench are communicated with the horizontal penetration hole and the microscopic stereoscopic channel; the outlet passage is communicated with the horizontal through hole, and the emptying channel and inlet passage are communicated with the diversion trench;

The boss is arranged on the frame and is located below the glass sheet entirety in a hollow transparent structure; the light source is arranged in the hollow place of the boss; the microscope is arranged on the frame and is located above the glass sheet entirety; an inflatable channel is respectively arranged at opposite ends on the frame, which is aligned at the middle of the transparent silicone sleeve.

Preferably, the transparent silicone sleeve is in a dumbbell shape, comprising a cuboid structure in the middle and a cylindrical structure connected at both ends; a transparent silicone wafer is arranged at the junction of the cuboid structure and the cylindrical structure, in the middle of which a rectangular pore channel is arranged; a sealing ring is hermetically connected between the cylindrical structure and the piston cap.

Preferably, the frame is in a cuboid shape; the top surface is an observation surface that is a transparent glass surface; the observation surface is parallel to the transparent silicone sleeve; the other five surfaces of the frame are of stainless steel; a microscope is arranged on the observation surface.

Preferably, the connecting plate is connected with the frame via the screw a, on which an oval pore channel is arranged for the piston to pass; a clamp support is clamped with the frame, and both ends of the clamp support are connected with the frame via the screw b; the piston is clamped between two screws b.

Preferably, the piston, piston cap, frame and connecting plate are made of stainless steel.

Preferably, the glass sheet entirety comprises the etched glass sheets on lower surface arranged side by side from top to bottom, the laser etched glass sheets and the etched glass sheets on upper surface.

On the other hand, the present invention provides an experimental method for the glass clamping model based on microscopic displacement experiment according to claim 6, comprising the following steps:

S1: After wiping clean the etched glass sheet on lower surface, laser etched glass sheet and etched glass sheet on upper surface with non-woven fabrics, fit these three glass sheets closely and make the microscopic stereoscopic channel located between these three glass sheets to form a glass sheet entirety;

S2: After inserting the piston with inlet passage and emptying channel into the piston cap, clamp both ends of the clamp support onto the frame and tighten the screw b to fix the piston;

S3: Fix the connecting plate onto the frame via the screw a;

S4: Put the fitted glass sheet entirety into the oval pore channel of the connecting plate in the order of the etched glass sheet on lower surface located on the top, laser etched glass sheet located in the middle and etched glass sheet on upper surface located on the bottom; slowly push the glass sheet entirety to move forward via the piston with an outlet passage until both ends of the horizontal channel of glass sheet entirety are fitted closely with the piston, and tighten the compression screw on the screw compression bracket to fix the stainless steel piston;

S5: Connect the inflatable channel to the gas booster pump to fill the nitrogen, and make the transparent silicone sleeve tightly suck the upper and lower surfaces of glass sheet entirety to be fitted closely with the glass sheet entirety;

S6: Connect a threaded plug to the outlet passage of the glass clamping model based on microscopic displacement experiment and connect a gas-liquid shared quick coupling to the inlet passage; connect a syringe containing liquid to the other side of the coupling;

S7: Place the syringe under the syringe pressure plate of micro syringe pump for being fixed; by setting the injection velocity of micro syringe pump, make the sliding block on the micro syringe pump push the syringe piston to fill the liquid; observe whether the liquid continuously flows out from the opening of the emptying channel; if not, check whether the inlet passage is communicated with the emptying, channel; if liquid continuously flows out, turn off the micro syringe pump;

S8: Connect a gas-liquid shared quick coupling to the inlet passage of the glass clamping model based on microscopic displacement experiment, and connect the syringe containing liquid to the other side of the coupling; and connect a threaded plug to the emptying channel;

S9: Place the syringe under the syringe pressure plate of micro syringe pump for being fixed; by setting the injection velocity of micro syringe pump, make the sliding block on the micro syringe pump push the syringe piston to fill the liquid;

S9.1: In the displacement process, place the light source into the boss of the glass clamping model based on microscopic displacement experiment, and automatically adjust the luminance of light source according to the experimental environment requirements;

S9.2: Place the glass clamping model based on microscopic displacement experiment on the carrier of the microscope, and observe from the observation surface of the frame in, the glass clamping model based on microscopic displacement experiment;

S9.3: Connect the computer, open the image acquisition software, save the images of the displacement process, and then process and analyze the images to study the microscopic seepage characteristics of heavy oil with water flooding under different experimental conditions.

Compared with the prior art, the present invention has the following beneficial technical effects:

1. Three glass sheets are used in the experiment, which have excellent light transmission and through which the flow state of fluid can be observed more clearly.

2. A laser etched glass sheet is added between the etched glass sheet on upper surface and the etched glass sheet on lower surface to form a microscopic stereoscopic channel. The channel has some morphological distribution characteristics of three-dimensional pore system and is capable of controlling the changes in pore channel, size of the pore system more accurately.

3. In the experiment, nitrogen is filled to make the transparent silicone sleeve tightly suck the upper and lower surfaces of the glass sheet entirety and be more closely fitted with the glass sheet entirety, and simulate the environment in which the fluid flows in the stratum more accurately.

4. In this experimental model, the light source is placed in the hollow transparent boss under the transparent silicone sleeve, and the observation is made from the transparent glass observation surface above the transparent silicone sleeve with a microscope, which can expand the experimental observation range more easily and increase the clarity of observation.

The explanation of serial numbers in the figure is as follows: 1—Transparent silicone sleeve, 101—Transparent silicone wafer, 102—Horizontal penetration hole, 2—Piston, 201—Emptying channel, 202—Inlet passage, 203—Outlet passage, 204—Horizontal through hole, 205—Diversion trench, 3—Piston cap, 4—Frame, 401—Inflatable channel, 402—Observation surface, 5—Connecting plate, 501—Screw a, 6—Screw compression bracket, 601—Compression screw, 7—Clamp support, 701—Screw b, 8—Sealing ring, 9—Microscopic stereoscopic channel, 10—Etched glass sheet on lower surface, 11—Laser-etched glass sheet, 12—Etched glass sheet on upper surface, 13—Boss, 14—Light source, 15—Microscope.

DETAILED DESCRIPTION OF THE PREFERRED EMBODIMENT

Embodiment 1

A glass clamping model based on microscopic displacement experiment as proposed in the present invention, comprises a transparent silicone sleeve 1, a piston 2, a piston cap 3, a frame 4, a connecting plate 5, a screw compression bracket 6, a clamp support 7, a glass sheet entirety, a boss 13, a light source 14 and a microscope 15.

As shown in FIG. 1-7, the glass sheet entirety is placed in the transparent silicone sleeve 1, and the glass sheet entirety comprises the etched glass sheets 10 on lower surface arranged side by side from top to bottom, the laser etched glass sheets 11 and the etched glass sheets on upper surface 12. The glass sheet entirety has a microscopic stereoscopic channel 9, and the transparent silicone sleeve 1 has a horizontal penetration hole 102. The transparent silicone sleeve 1 is sheathed on the piston cap 3, and the piston cap 3 is arranged on the frame 4. The piston 2 penetrates through the horizontal penetration hole 102. The piston 2 protrudes from the frame 4 at both ends. The connecting plate 5 and the clamp support 7 are respectively connected to both ends of the frame 4. The end of the screw compression bracket 6 is clamped between the frame 4 and the connecting plate 5. The screw compression bracket 6 is connected with a compression screw 601. The piston 2 and the frame 4 are connected with the clamp support 7. An emptying channel 201 and an inlet passage 202 are respectively arranged at both ends of the piston 2 on the clamp support 7 side, and an outlet passage 203 is arranged at the end of the piston 2 on the connecting plate 5 side. A horizontal through hole 204 is arranged inside the piston 2. A diversion trench 205 is vertically arranged in the middle of the top surface of the piston 2. The horizontal through hole 204 and the diversion trench 205 are communicated with the horizontal penetration hole 102 and the microscopic stereoscopic channel 9. The outlet passage 203 is communicated with the horizontal through hole 204, and the emptying channel 201 and inlet passage 202 are communicated with the diversion trench 205.

The boss 13 is arranged on the frame 4 and is located below the glass sheet entirety in a hollow transparent structure. The light source 14 is arranged in the hollow place of the boss 13. The microscope 15 is arranged on the frame 4 and is located above the glass sheet entirety. An inflatable channel 401 is respectively arranged at opposite ends on the frame 4, which is aligned at the middle of the transparent silicone sleeve 1.

Embodiment 2

Figure 1:
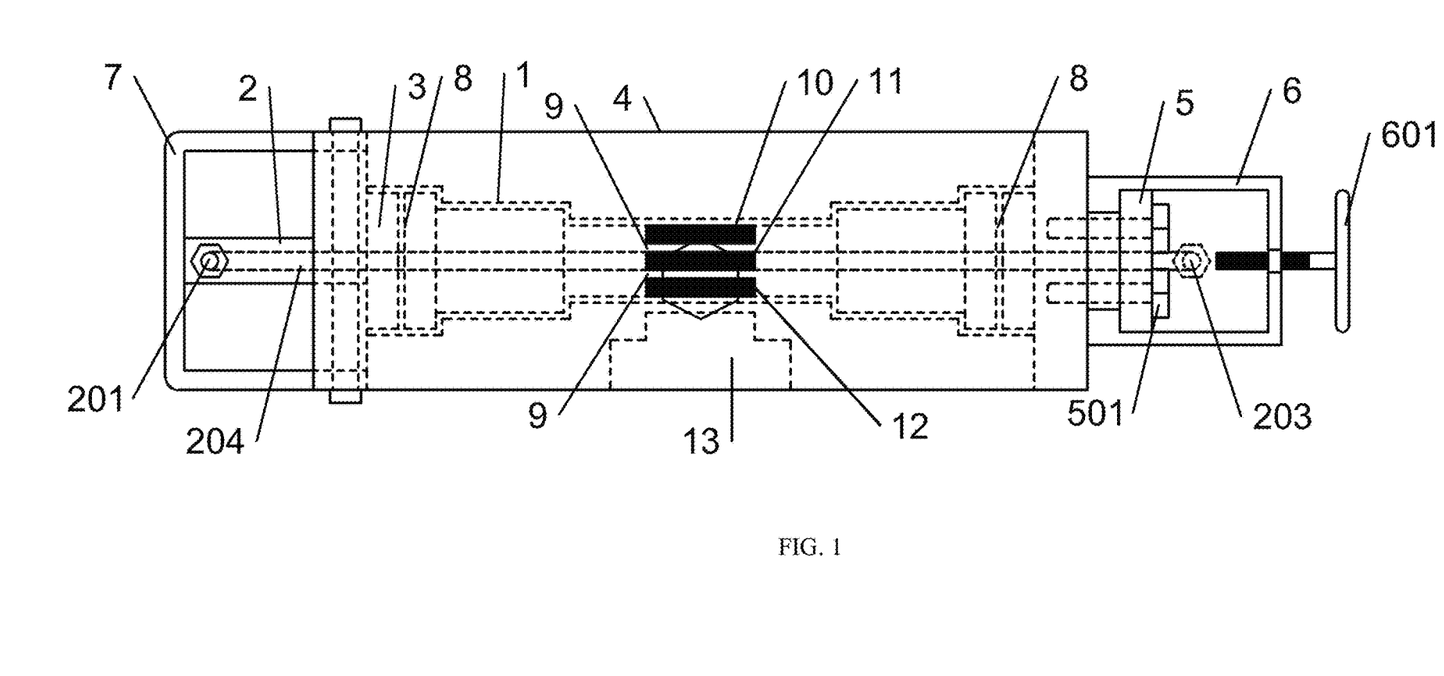
FIG. 1 is the structural schematic diagram of an embodiment in the present invention.
Figure 2:
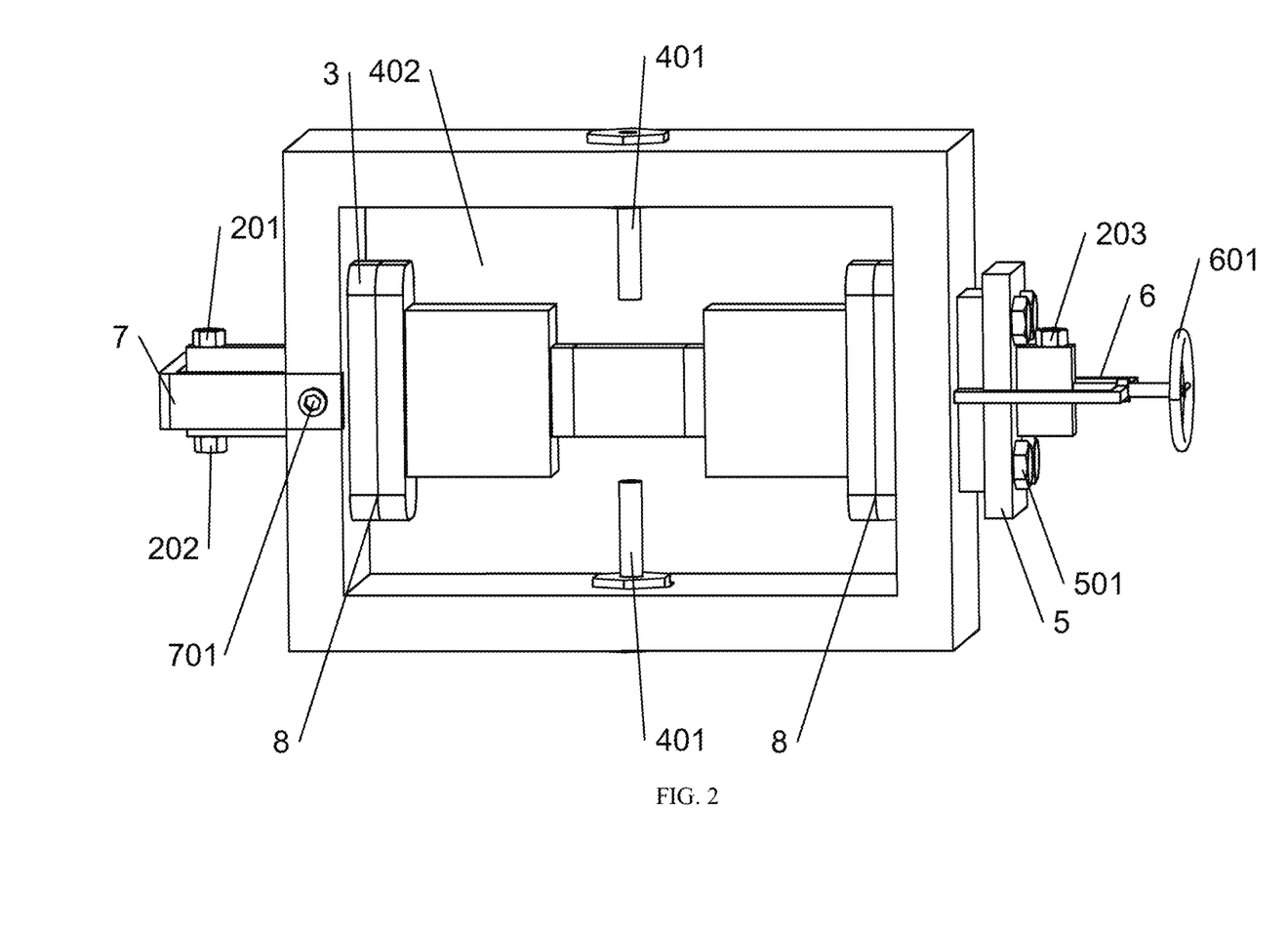
FIG. 2 is the structural perspective of top view of an embodiment in the present invention.
Figure 3:
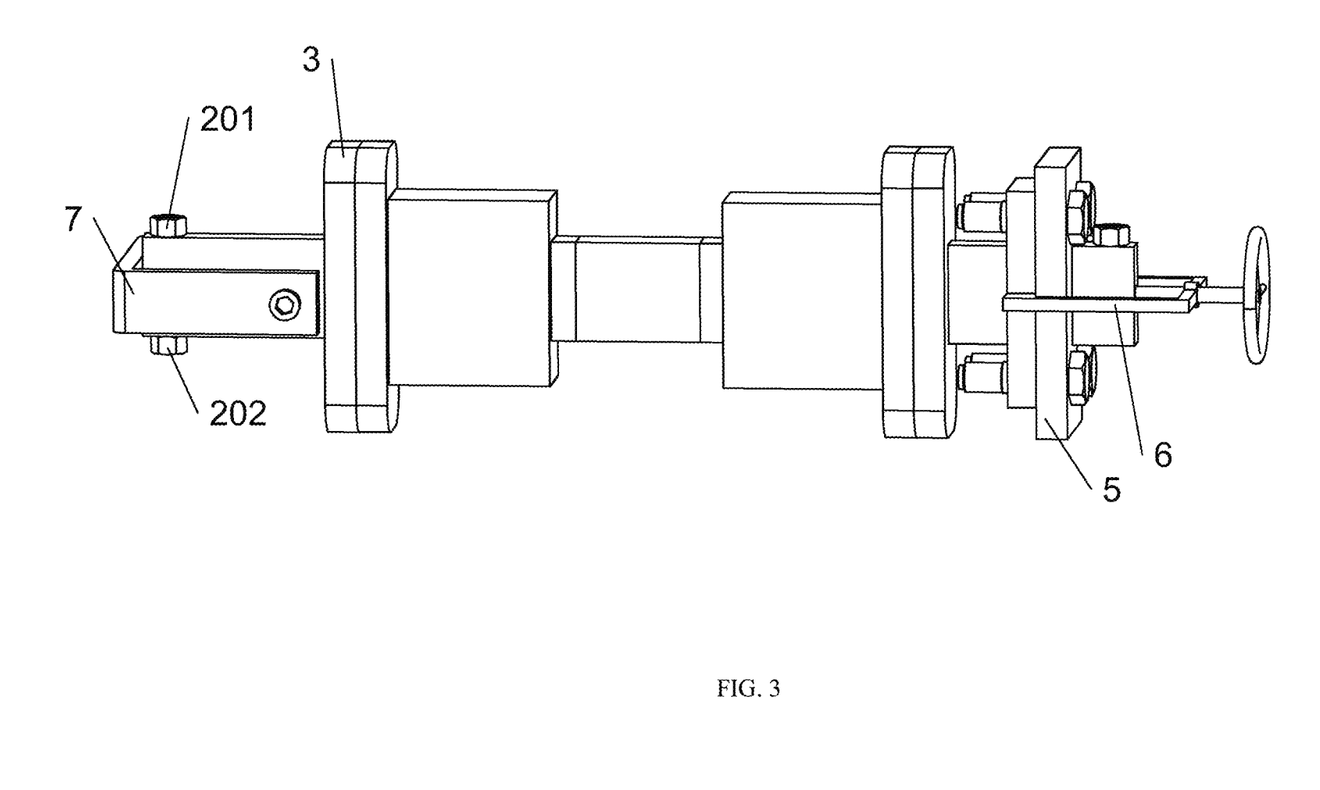
FIG. 3 is the inner core diagram of an embodiment in the present invention.
Figure 4:
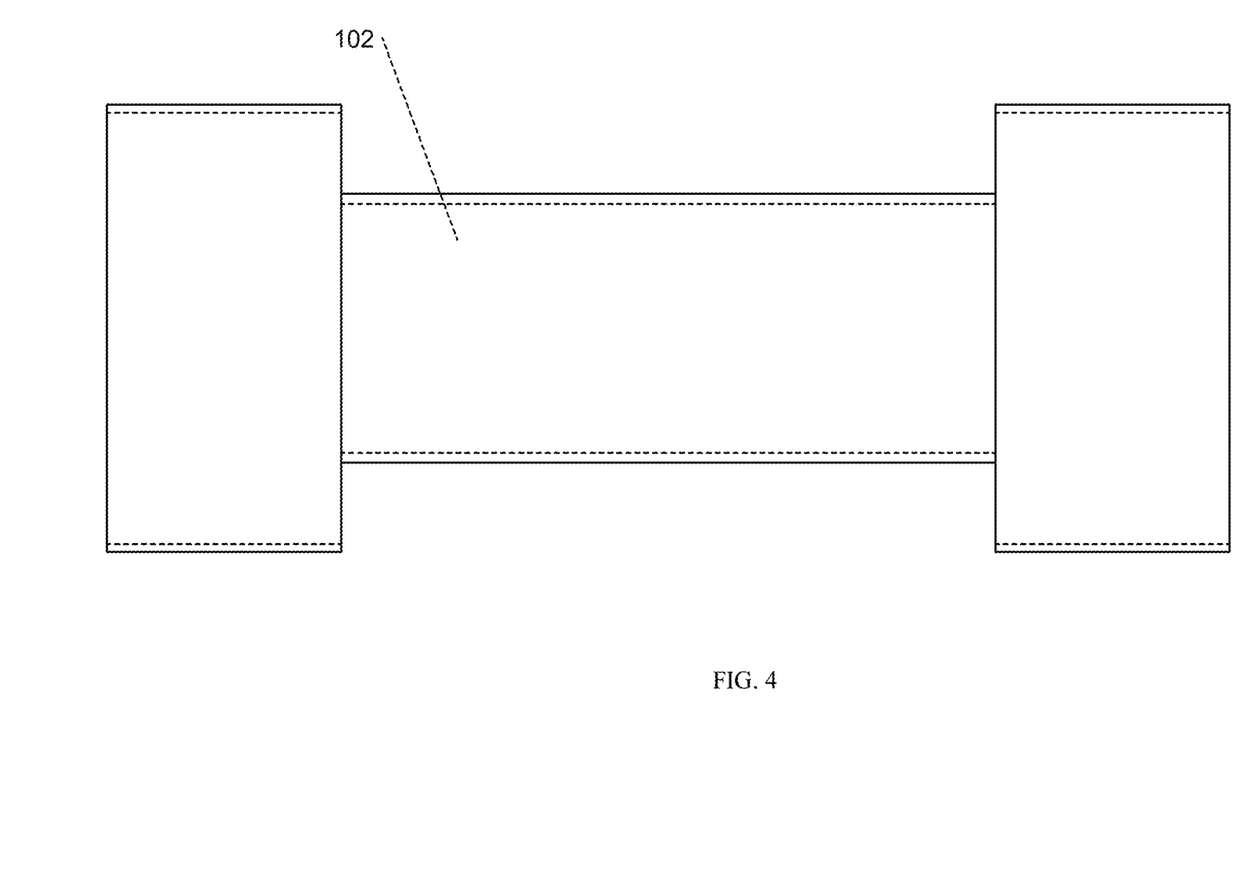
FIG. 4 is the front view of transparent silicone sleeve in an embodiment of the present invention.
Figure 5:
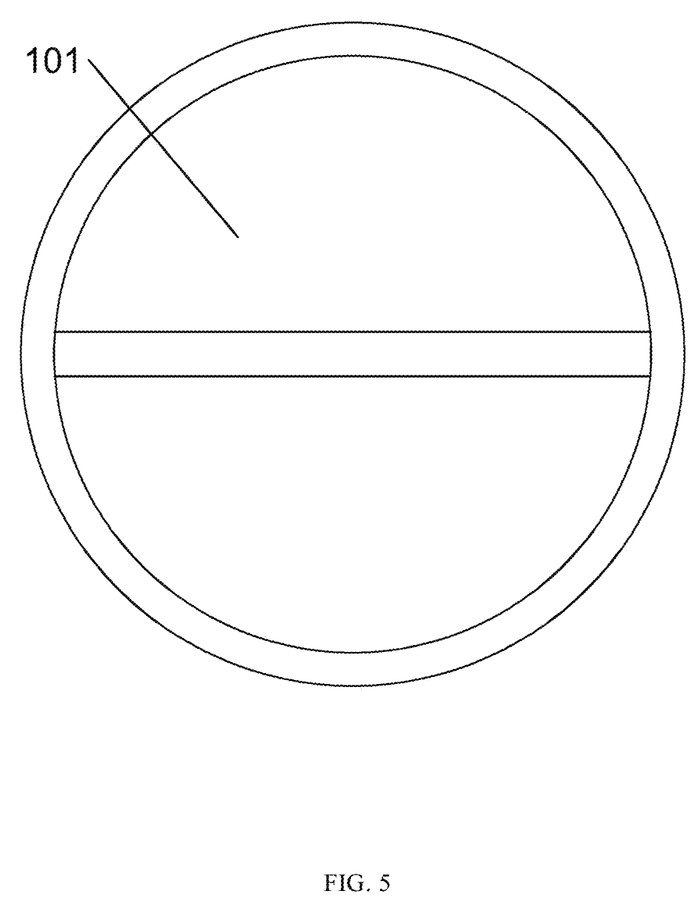
FIG. 5 is the side view of transparent silicone sleeve in an embodiment of the present invention.
Figure 6:
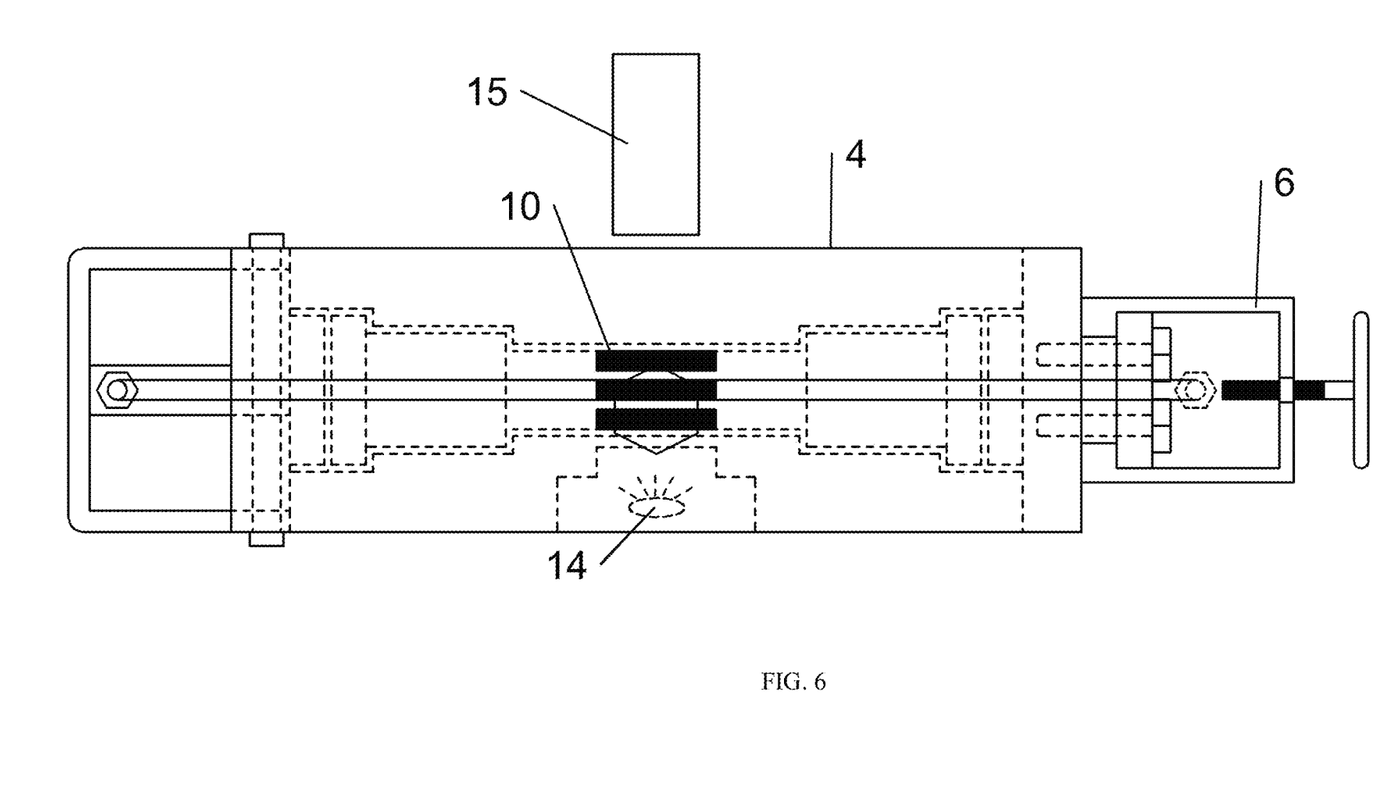
FIG. 6 is the structural schematic diagram of an embodiment in use in the present invention.
Figure 7:
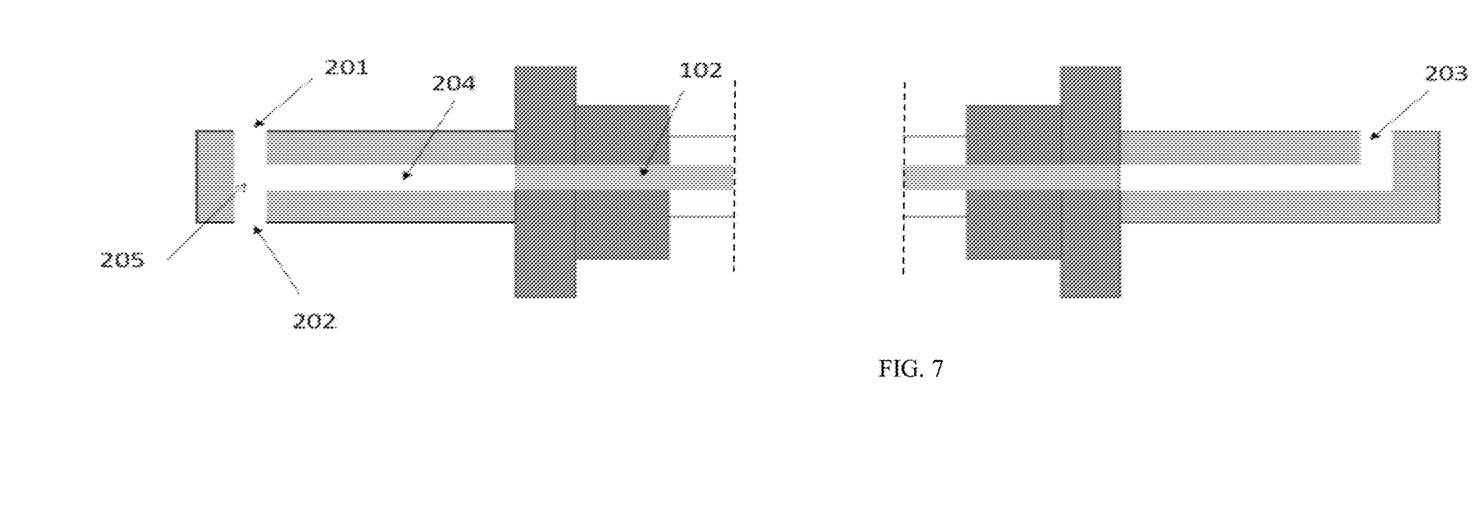
FIG. 7 is a structural schematic diagram of the inner core (except the glass sheet entirety) of the present invention.

A glass clamping model based on microscopic displacement experiment: compared with Embodiment 1, in this embodiment, the transparent silicone sleeve 1 is in a dumbbell shape, comprising a cuboid structure in the middle and a cylindrical structure connected at both ends. A transparent silicone wafer 101 is arranged at the junction of the cuboid structure and the cylindrical structure, in the middle of which a rectangular pore channel is arranged. A sealing ring 8 is hermetically connected between the cylindrical structure and the piston cap 3 to ensure the sealing performance.

The frame 4 is in a cuboid shape. The top surface is an observation surface 402 that is a transparent glass surface. The observation surface 402 is parallel to the transparent silicone sleeve 1. The other five surfaces of the frame 4 are of stainless steel. A microscope 15 is arranged on the observation surface 402, which enables a clear observation.

The connecting plate 5 is connected with the frame 4 via the screw a 501, on which an oval pore channel is arranged for the piston 2 to pass. A clamp support 7 is clamped with the frame 4, and both ends of the clamp support 7 are connected with the frame 4 via the screw b 701. The piston 2 is clamped between two screws b 701. By rotating the two screws b 701 on both sides, the clamp support 7 can be installed onto the frame 4, and at the same time the end of the screw b 701 can be arranged against the piston 2 to clamp the piston 2. In addition, the screw compression bracket 6 is compressed on the frame 4 via the screw a 501. The compression screw 601 is rotated against the piston 2 to further compress the piston 2. The piston 2, piston cap 3, frame 4 and connecting plate are made of stainless steel, which will not get rusty due to high structural strength.

Embodiment 3

The present invention provides an experimental method for the glass clamping model based on microscopic displacement experiment, comprising the following steps:

S1: is After wiping clean the etched glass sheet 10 on lower surface, laser etched glass sheet 11 and etched glass sheet 12 on upper surface with non-woven fabrics, fit these three glass sheets closely and make the microscopic stereoscopic channel 9 located between these three glass sheets to form a glass sheet entirety;

S2: After inserting the piston 2 with inlet passage 202 and emptying channel 201 into the piston cap 3, clamp both ends of the clamp support 7 onto the frame 4 and tighten the screw b 701 to fix the piston 2;

S3: Fix the connecting plate 5 onto the frame 4 via the screw a 501;

S4: Put the fitted glass sheet entirety into the oval pore channel of the connecting plate 5 in the order of the etched glass sheet 10 on lower surface located on the top, laser etched glass sheet 11 located in the middle and etched glass sheet 12 on upper surface located on the bottom. Slowly push the glass sheet entirety to move forward via the piston 2 with an outlet passage 203 until both ends of the horizontal channel of glass sheet entirety are fitted closely with the piston 2, and tighten the compression screw 601 on the screw compression bracket 6 to fix the stainless steel piston 2;

S5: Connect the inflatable channel to the gas booster pump to fill the nitrogen, and make the transparent silicone sleeve 1 tightly suck the upper and lower surfaces of glass sheet entirety to be fitted closely with the glass sheet entirety;

S6: Connect a threaded plug to the outlet passage 203 of the glass clamping model based on microscopic displacement experiment and connect a gas-liquid shared quick coupling to the inlet passage 202; and connect a syringe containing liquid to the other side of the coupling:

S7: Place the syringe under the syringe pressure plate of micro syringe pump for being fixed. By setting, the injection velocity of micro syringe pump, make the sliding block on the micro syringe pump push the syringe piston to fill the liquid. Observe whether the liquid continuously flows out from the opening of the emptying channel 201; if not, check whether the inlet passage 202 is communicated with the emptying channel 201; if liquid continuously flows out, turn off the micro syringe pump;

S8: Connect a gas-liquid shared quick coupling to the inlet passage 202 of the glass clamping model based on microscopic displacement experiment, and connect the syringe containing liquid to the other side of the coupling; and connect a threaded plug to the emptying channel 201;

S9: Place the syringe under the syringe pressure plate of micro syringe pump for being fixed. By setting, the injection velocity of micro syringe pump, make the sliding block on the micro syringe pump push the syringe piston to fill the liquid;

S9.1: In the displacement process place the light source 14 into the boss 13 of the glass clamping model based on microscopic displacement experiment, and automatically adjust the luminance of light source according to the experimental environment requirements;

S9.2: Place the glass clamping model based on microscopic displacement experiment on the carrier of the microscope 15, and observe from the observation surface 402 of the frame 4 in the glass clamping model based on microscopic displacement experiment;

S9.3: Connect the computer, open the image acquisition software, save the images of the displacement process, and then process and analyze the images to study the microscopic seepage characteristics of heavy oil with water flooding under different experimental conditions.

In the present invention, 1. Three glass sheets are used in the experiment, which have excellent light transmission and through which the flow state of fluid can be observed more clearly.

2. A laser etched glass sheet is added between the etched glass sheet on upper surface and the etched glass sheet on lower surface to form a microscopic stereoscopic channel 9. The channel has some morphological distribution characteristics of three-dimensional pore system and is capable of controlling the changes in pore channel size of the pore system more accurately.

3. In the experiment, nitrogen is filled, to make the transparent silicone sleeve 1 tightly suck the upper and lower surfaces of the glass sheet entirety and be more closely fitted with the glass sheet entirety, and simulate the environment in which the fluid flows in the stratum more accurately.

4. In this experimental model, the light source 14 is placed in the hollow transparent boss 13 under the transparent silicone sleeve 1, and the observation is made from the transparent glass observation surface 402 above the transparent silicone sleeve 1 with a microscope 15, which can expand the experimental observation range more easily and increase the clarity of observation.

The embodiments of the present invention are described in details in conjunction with the accompanying drawings, but, the present invention is not limited to these embodiments, and various changes can be made within the scope of knowledge possessed by those skilled in the art without deviating from the purpose of the present invention.

What is claimed is:

1. A glass clamping device for observing microscopic fluid displacement, comprising a transparent silicone sleeve, a piston, a piston cap, a frame, a connecting plate, a screw compression bracket, a clamp support, a glass sheet entirety, a boss, a light source and a microscope; wherein the glass sheet entirety comprises a stack of glass sheets; the glass sheet entirety is placed in the transparent silicone sleeve, the glass sheet entirety has a microscopic stereoscopic channel, and the transparent silicone sleeve has a horizontal penetration hole; the transparent silicone sleeve is sheathed on the piston cap, piston penetrates through the horizontal penetration hole, and the piston protrudes from a first frame end and a second frame end of the frame the clamp support is connected an outside face of the first frame end of the frame; the piston cap is arranged on an inside face of the first frame end; and the connecting plate is connected to an outside face of the second frame end and an end of the screw compression bracket is clamped to the outside face of the second frame end alongside of the connecting plate; an outlet passage is arranged on a top of the screw compression bracket; the screw compression bracket is connected with a compression screw; an emptying channel and an inlet passage are respectively arranged at a top and bottom of an end of the piston protruding the first frame end; a horizontal through hole is arranged inside the piston, a diversion trench is vertically arranged in the piston, and the horizontal through hole and the diversion trench are communicated with the horizontal penetration hole and the microscopic stereoscopic channel; the outlet passage is communicated with the horizontal through hole, and the emptying channel and inlet passage are communicated with the diversion trench; the boss is arranged on the frame and is located below the glass sheet entirety in a hollow transparent structure; the light source is arranged in the hollow place of the boss; the microscope is arranged on the frame and is located above the glass sheet entirety; an inflatable channel is respectively arranged at a top and bottom of the frame, where the inflatable channel is aligned a middle of the transparent silicone sleeve.

2. The glass clamping device for observing microscopic fluid displacement according to claim 1, wherein the transparent silicone sleeve is in a dumbbell shape, comprising a cuboid structure in middle and a cylindrical structure connected to both ends of the cuboid structure; a transparent silicone wafer is arranged at a junction of the cuboid structure and the cylindrical structure, in a middle of which a rectangular pore channel is arranged; a sealing ring is hermetically connected between the cylindrical structure and the piston cap.

3. The glass clamping device for observing microscopic fluid displacement to claim 2, wherein the frame is in a cuboid shape; a top surface of the frame is an observation surface that is a transparent glass surface; the observation surface is parallel to the transparent silicone sleeve; the other five surfaces of the frame are made of stainless steel; a microscope is arranged on the observation surface.

4. The glass clamping device for observing microscopic fluid displacement according to claim 3, wherein the connecting plate is connected to the outside face of the second frame end via at least one screw, an oval pore channel is arranged in the second frame end for the piston to pass through during installation; the clamp support is connected to the outside face of the first frame end via at least one screw.

5. The glass clamping device for observing microscopic fluid displacement according to claim 4, wherein the piston, the piston cap and the connecting plate are made of stainless steel.

6. The glass clamping device for observing microscopic fluid displacement according to claim 4, wherein the glass sheet entirety is constructed as a top to bottom stack of at least three glass sheets comprising an upper etched glass sheet stacked above a middle laser etched glass sheet stacked above a lower etched glass sheet; wherein a lower surface of the upper etched glass sheet is etched, an upper surface of the lower etched glass sheet is etched.

7. A method for the glass clamping device to perform an observation on microscopic fluid displacement according to claim 6, comprising the following steps:

S1: after wiping clean the upper etched glass sheet, the middle laser etched glass sheet and the lower etched glass sheet with non-woven fabrics, fitting the three glass sheets closely to make the microscopic stereoscopic channel locate between the three glass sheets to form the glass sheet entirety; S2: after inserting the piston with the inlet passage and the emptying channel into the piston cap connecting the clamp support to the outside face of the first frame end via at least one screw; S3: fixing the connecting plate onto the frame via at least one screw; S4: putting the fitted glass sheet entirety into the oval pore channel of the connecting plate in an order of the upper etched glass sheet stacked above the middle laser etched glass sheet stacked above the lower etched glass sheet; pushing the glass sheet entirety to move forward via the piston with the outlet passage until both ends of the horizontal channel of glass sheet entirety are fitted closely with the piston, and tightening the compression screw on the screw compression bracket to fix the steel piston; S5: connecting the inflatable channel to a gas booster pump to fill nitrogen, and making the transparent silicone sleeve tightly suck upper and lower surfaces of the glass sheet entirety fit closely with the glass sheet entirety; S6: connecting a threaded plug to the outlet passage of the glass clamping device and connecting a gas-liquid shared quick coupling to the inlet passage; connecting a syringe containing a liquid to another side of the gas-liquid shared quick coupling; S7: placing the syringe under a syringe pressure plate of a micro syringe pump for being fixed; by setting an injection velocity of the micro syringe pump, making a sliding block on the micro syringe pump push a syringe piston to fill the liquid; observing whether the liquid continuously flows out from an opening of the emptying channel; if not, checking whether the inlet passage is communicated with the emptying channel; if the liquid continuously flows out, turning off the micro syringe pump; S8: connecting the gas-liquid shared quick coupling to the inlet passage of the glass clamping device, and connecting the syringe containing the liquid to the other side of the gas-liquid shared quick coupling; and connecting the threaded plug to the emptying channel; S9: placing the syringe under the syringe pressure plate of the micro syringe pump for being fixed; by setting the injection velocity of the micro syringe pump, making the sliding block on the micro syringe pump push the syringe piston to fill the liquid; S9.1: in a displacement process, placing the light source into the boss of the glass clamping device, and automatically adjusting a luminance of the light source; S9.2: placing the glass clamping device on a carrier of the microscope, and observing from the observation surface of the frame in the glass clamping device; S9.3: connecting a computer, opening an image acquisition software, saving images of the displacement process, and then processing and analyzing the images to study microscopic seepage characteristics of a heavy oil with water flooding.

* * * * *